(No Model.)
J. G. McALPINE.
CHUCK.
No. 504,047. Patented Aug. 29, 1893.
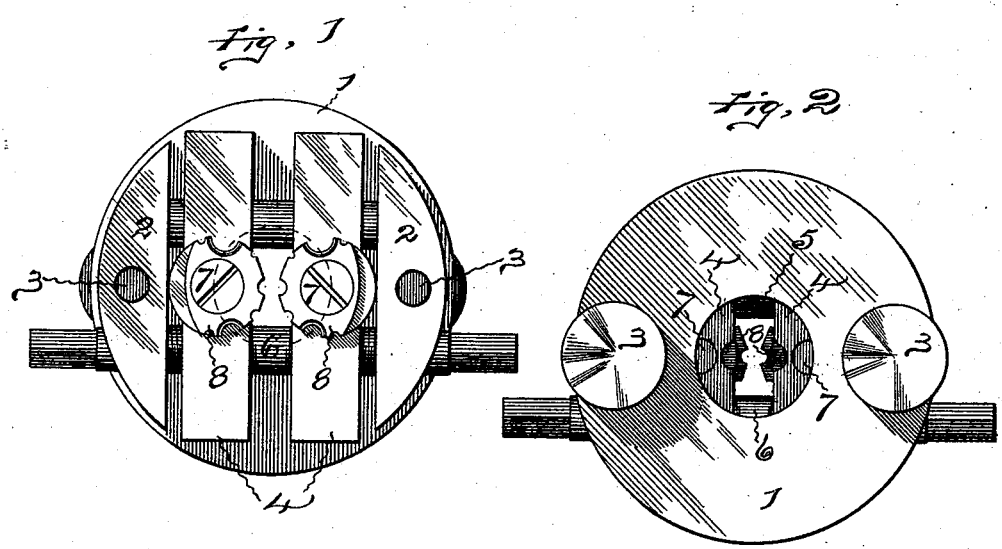
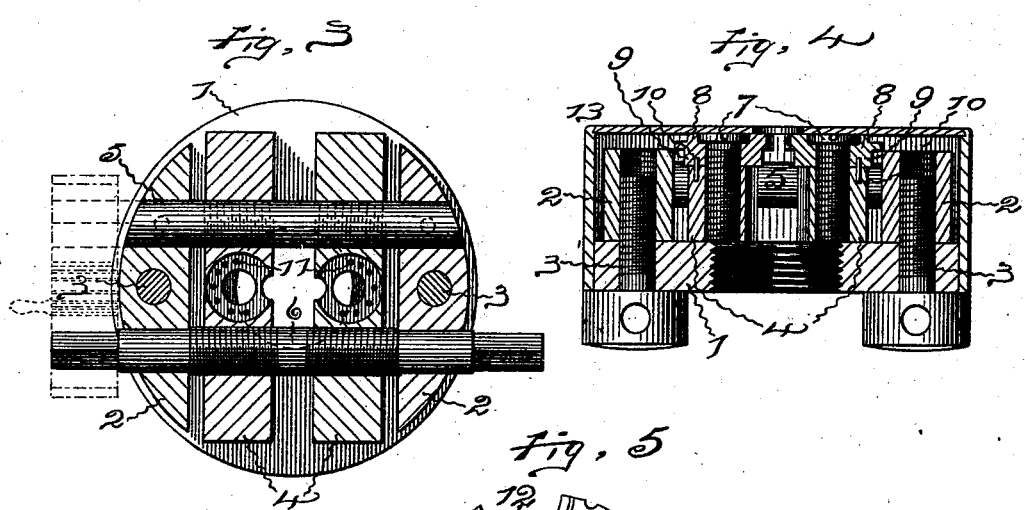
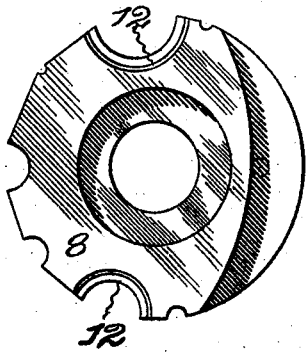
Witnesses:
C. E. Buckland.
P. A. Phelps.
Inventor,
James G. McAlpine
by
Harry P. Williams
atty.

UNITED STATES PATENT OFFICE.

JAMES G. McALPINE, OF HARTFORD, CONNECTICUT.

CHUCK.

SPECIFICATION forming part of Letters Patent No. 504,047, dated August 29, 1893.

Application filed March 15, 1893. Serial No. 466,063. (No model.)

*To all whom it may concern:*

Be it known that I, JAMES G. McALPINE, a citizen of the United States, residing at Hartford, in the county of Hartford and State of Connecticut, have invented certain new and useful Improvements in Chucks, of which the following is a full, clear, and exact specification.

The invention relates more particularly to the class of chucks designed for the use of watch makers and repairers, and the object is to provide a simple, cheap chuck which can be attached to the spindle of a fiddle bow or power lathe for firmly holding small and delicate parts and pieces of varying size so that they may be operated upon.

Referring to the accompanying drawings, where the device is illustrated on greatly enlarged scale, Figure 1 is a plan of the chuck. Fig. 2 is a bottom view. Fig. 3 is a horizontal section. Fig. 4 is a vertical section; and Fig. 5 is a detail view, on still larger scale, of one of the holding disks which bear the jaws.

In the views 1 indicates a circular back plate of brass or any other suitable material, having a central threaded opening by means of which it may be secured to the spindle of a lathe or other support. Blocks 2 are stationarily held to the back plate by screws 3, and between these blocks 2 are movable blocks 4.

On each side of the central diameter of the chuck, perforations are made through the blocks 2 and 4, and passing through these perforations are spindles 5 and 6. In the form shown, the spindle 5 is held securely at its ends by the blocks 2, while the blocks 4 are free to feed along the spindle 5. The spindle 6 which turns loosely in the fixed blocks, has portions that are oppositely threaded, and these fit threads tapped in the perforations in the blocks 4, while the ends of this spindle are preferably squared to receive a key by means of which it may be rotated, and when thus rotated the movable blocks are drawn toward or from each other according to the direction of rotation of the screw-threaded spindle.

Held by screws 7 on the face of the movable blocks, are the holding disks 8 formed of hard metal with circular or angular indentations of varying size cut in their peripheries to form the holding jaws of the chuck. These disks have thin hubs 9 on their under faces, that fit into sockets cut in the face of the movable blocks, and projecting from these hubs is a small pin 10 that fits one of the perforations 11 made in the block in order to hold the disks from rotation when they are set. The indentations in the peripheries of the disks are made of different sizes to receive staffs and arbors of different diameters, and a portion of the upper surface of the disks is cut away so as to permit the edge of a balance to lie flat when its arbor is held in the chuck; while around some of the indentations, as at 12 in Fig. 5, the disks are cut away to permit the entrance of a jewel. A cover 13 is sometimes put over the parts to exclude dust and dirt, and both of the spindles may be threaded if desired, and of course the threaded spindle shown need be squared on but one end.

To use the chuck, the screws 7 are loosened and the disks 8 turned until jaws of the correct size are opposite each other. Then when the screws 7 are tightened the pins 10 set into one of the sockets 11 and hold the jaws from rotation, and after the arbor or the part to be held is inserted between the jaws, the threaded spindle is turned so as to close the blocks bearing these disks with the jaws together.

The chuck is simple, cheap, readily adjustable for delicate parts or pieces of varying size, and will firmly hold the smallest pieces without danger of breaking them or allowing them to slip and bend, and can be made any convenient size. For chucks of large size pinions can be slipped upon the ends of the spindles and driven by a gear with a handle, that meshes with them, as shown in dotted outline in Fig. 3.

I claim as my invention—

In a chuck in combination, a flat base plate with a central opening, adapted to be secured to the spindle of the lathe, blocks with smooth openings through them near each end, stationarily held to the base plate with a space between them, a smooth spindle passing from one block to the other and secured from movement in the openings of the stationary blocks, a spindle with its middle portion threaded, passing from one block to the other and rotarily held in the smooth openings of the stationary blocks, and blocks movably supported by the spindles, with smooth openings through one end for the smooth spindle and threaded openings through the opposite end for the threaded spindle, said blocks bearing rotary disks with indentations in the peripheries of various size, substantially as specified.

JAMES G. McALPINE.

Witnesses:
H. R. WILLIAMS,
P. A. PHELPS.